United States Patent
Matsushima

(10) Patent No.: US 11,425,257 B2
(45) Date of Patent: Aug. 23, 2022

(54) RELAYING DEVICE AND MONITORING METHOD OF VOICE COMMUNICATION

(71) Applicant: ICOM INCORPORATED, Osaka (JP)

(72) Inventor: Hisaaki Matsushima, Osaka (JP)

(73) Assignee: ICOM INCORPORATED, Osaka (JP)

( * ) Notice: Subject to any disclaimer, the term of this patent is extended or adjusted under 35 U.S.C. 154(b) by 0 days.

(21) Appl. No.: 17/273,025

(22) PCT Filed: Apr. 26, 2019

(86) PCT No.: PCT/JP2019/017870
§ 371 (c)(1),
(2) Date: Mar. 3, 2021

(87) PCT Pub. No.: WO2020/066105
PCT Pub. Date: Apr. 2, 2020

(65) Prior Publication Data
US 2021/0329130 A1    Oct. 21, 2021

(30) Foreign Application Priority Data
Sep. 27, 2018    (JP) .............................. JP2018-181218

(51) Int. Cl.
*H04M 3/56* (2006.01)
*H04M 3/22* (2006.01)
*H04M 7/12* (2006.01)

(52) U.S. Cl.
CPC .......... *H04M 3/567* (2013.01); *H04M 3/2281* (2013.01); *H04M 7/122* (2013.01); *H04M 7/1235* (2013.01)

(58) Field of Classification Search
CPC .... H04M 3/567; H04M 3/2281; H04M 7/122; H04M 7/1235; H04M 3/42221;
(Continued)

(56) References Cited

U.S. PATENT DOCUMENTS 8,909,811 B2 * 12/2014 Margolis ............. H04L 67/1089
709/227
2002/0006187 A1 * 1/2002 Lukas ................. H04M 3/2218
379/67.1
(Continued)

FOREIGN PATENT DOCUMENTS

CN   109462753 A * 3/2019 ............. H04N 17/00
JP   2005-33311 A   2/2005
(Continued)

OTHER PUBLICATIONS

The extended European search report of the corresponding EP application No. 19867211.5 dated Mar. 18, 2022.

*Primary Examiner* — Akelaw Teshale
(74) *Attorney, Agent, or Firm* — Muncy, Geissler, Olds & Lowe, P.C.

(57) ABSTRACT

[Problem] Provided is a relaying device that can track and record a communicated voice of a specific communication terminal using a mixing function of the relaying device.
[Solution] When a communication terminal has sent a call packet to call another at least one communication terminal, a communication session in which this communication terminal that has made a call and a communication terminal that has been called are participating terminals is established. In the communication session, voice communication is relayed by transferring a voice signal which is transmitted from the participating terminals to another at least one communication terminal. A virtual device is registered as a participating terminal of the communication session and the voice signal which is transmitted from the communication session to the virtual device is recorded in the relaying device.

6 Claims, 13 Drawing Sheets

(58) Field of Classification Search
CPC ........... H04M 3/56; H04M 2203/5018; H04M 1/724; H04M 1/72412; H04M 15/715; H04M 15/887; H04M 2215/54; H04M 3/42391; H04M 15/7652; H04M 15/7655; H04M 1/2473; H04M 1/2475; H04M 1/2535; H04M 1/72454; H04M 2201/40; H04M 2201/60; H04M 2203/6045; H04M 2250/62; H04M 3/42042; H04M 3/42068; H04M 3/563; H04M 3/569; H04M 7/0027; H04M 7/0036; H04M 15/00; H04M 15/08; H04M 15/09; H04M 15/10; H04M 15/56; H04M 17/20; H04M 1/2757; H04M 1/72478; H04M 2201/18; H04M 2201/50; H04M 2203/2061; H04M 2203/5009; H04M 2203/6027; H04M 2203/6081; H04M 2203/655; H04M 3/2218; H04M 3/38; H04M 3/42382; H04M 3/436; H04M 3/4365; H04M 3/53; H04M 3/565; H04M 3/568; H04M 7/00; H04M 7/006; H04W 4/80; H04W 4/02; H04W 4/029; H04W 12/08; H04W 4/90; H04W 12/06; H04W 12/63; H04W 4/12; H04W 4/38; H04W 84/18; H04W 88/06; H04W 8/005; H04W 12/33; H04W 48/16; H04W 4/08; H04W 4/14; H04W 4/24; H04W 4/50; H04W 88/16; H04W 8/265; H04W 12/02; H04W 12/069; H04W 12/084; H04W 12/30; H04W 12/55; H04W 4/021; H04W 4/023; H04W 4/06; H04W 4/21; H04W 4/70; H04W 60/00; H04W 64/003; H04W 76/10; H04W 76/40; H04W 88/02; H04W 8/06; H04W 8/16; H04W 12/009; H04W 12/03; H04W 12/033; H04W 12/50; H04W 28/0819; H04W 28/0831; H04W 36/0016; H04W 36/0022; H04W 36/0033; H04W 36/14; H04W 48/20; H04W 4/16; H04W 4/33; H04W 52/146; H04W 52/242; H04W 52/243; H04W 52/246; H04W 52/265; H04W 52/283; H04W 52/367; H04W 52/42; H04W 60/04; H04W 64/00; H04W 72/0426; H04W 72/08; H04W 76/11; H04W 76/14; H04W 76/18; H04W 76/23; H04W 76/45; H04W 76/50; H04W 80/10; H04W 84/12; H04W 88/18; H04W 8/20; H04W 8/26; H04L 65/1076; H04L 65/1083

See application file for complete search history.

(56) References Cited

U.S. PATENT DOCUMENTS

| | | | |
|---|---|---|---|
| 2009/0055548 A1* | 2/2009 | Williams | H04M 3/42221 709/231 |
| 2009/0279678 A1* | 11/2009 | Ross | H04M 3/4938 379/93.23 |
| 2011/0116492 A1 | 5/2011 | Byron et al. | |
| 2014/0119274 A1* | 5/2014 | Uwamori | H04M 3/568 370/315 |
| 2014/0201262 A1* | 7/2014 | Woo | H04L 67/42 709/203 |
| 2014/0244756 A1* | 8/2014 | Kanda | H04L 67/18 709/204 |
| 2015/0333817 A1* | 11/2015 | Uwamori | H04M 3/568 370/315 |
| 2016/0249274 A1* | 8/2016 | Sonobe | H04W 4/08 |
| 2016/0269681 A1* | 9/2016 | Horiuchi | H04L 12/1827 |
| 2017/0163332 A1 | 6/2017 | Sonobe | |
| 2017/0332211 A1* | 11/2017 | Uwamori | H04W 76/45 |
| 2018/0077204 A1* | 3/2018 | Inoue | H04L 65/1069 |
| 2019/0074892 A1 | 3/2019 | Sonobe | |

FOREIGN PATENT DOCUMENTS

| | | | | |
|---|---|---|---|---|
| JP | 2009-212908 A | | 9/2009 | |
| JP | 2011-147007 A | | 7/2011 | |
| JP | 2014-087027 A | | 5/2014 | |
| JP | 2020053835 A | * | 4/2020 | ......... H04M 3/2281 |
| WO | 2015/068663 A1 | | 5/2015 | |
| WO | 2016/002866 A1 | | 1/2016 | |

* cited by examiner

TERMINAL TABLE (CALL DESTINATION TABLE)

| ID | CALL TYPE | COMMUNICATION APPARATUS TYPE | ADDRESS INFORMATION (IP ADDRESS, PORT NO.) | BELONGING RADIO | PARTICIPATING SESSION NUMBER |
|---|---|---|---|---|---|
| 21 | INDIVIDUAL | ANALOG | (127.0.0.1, 30000) | | 1 |
| 22 | INDIVIDUAL | DIGITAL | (127.0.0.1, 30002) | | 2 |
| 31 | INDIVIDUAL | WLAN | (192.168.0.10, 10000) | | 2 |
| 41 | INDIVIDUAL | LTE | (192.168.0.11, 11000) | | 1 |
| 51 | INDIVIDUAL | SIP TERMINAL | (192.168.0.12, 20000) | | 2 |
| 101 | GROUP | | | 21,22,31 | 2 |
| 100 | PLENARY | | | | |

Fig. 3A

MIXING TABLE

| SESSION NUMBER | CALLING ID | DESTINATION ID | EXCLUDED TERMINAL | PARTICIPATING TERMINAL | RETENTION TIME(TS) |
|---|---|---|---|---|---|
| 1 | 21 | 41 | – | 21,41,VD1 | |
| 2 | 51 | 101 | 21 | 22,31,51,VD2,VD3 | |

Fig. 3B

PRIORITY TABLE

| COMMUNICATION MODE (CALL TYPE) | BELONGING TERMINAL |
|---|---|
| PLENARY COMMUNICATION | 1(HIGH) |
| INDIVIDUAL COMMUNICATION | 2 |
| GROUP COMMUNICATION | 3(LOW) |

Fig. 3C

VIRTUAL DEVICE TABLE

| VIRTUAL DEVICE (MONITORING CHANNEL) | CALL ID |
|---|---|
| VD1 | 21 |
| VD2 | 31 |
| VD3 | 51 |
| VD4 | 101 |

Fig. 3D

RELAYING DEVICE AND MONITORING METHOD OF VOICE COMMUNICATION

TECHNICAL FIELD

The present invention relates to a relaying device that relays voice communication, and more particularly to a recording function of a voice signal to be relaying.

BACKGROUND ART

Relaying devices that relay voice communication such as radio transceiver, a telephone, or the like made by a network are proposed (refer to Patent Literature 1, 2, and 3). As a result of connecting a plurality of relaying devices to a network, it is also possible that different type of communication apparatuses such as IP telephone and radio perform voice communication to each other. If the relaying device outputs a relaying voice signal to outside, it is possible to record the voice signal.

CITATION LIST

Patent Literature 1: JP 2014-087027A
Patent Literature 2: WO 2015/068663
Patent Literature 3: WO 2016/002866

PROBLEMS TO BE SOLVED BY INVENTION

However, in order for a relaying device configured as described above to output a voice signal to the outside of the relaying device, a device for external output needs to participated in the communication, and new hardware is needed. Also, although it is possible to realize recording of the communication by software, it takes time and effort to add a new recording function to the relaying device, and a new burden is imposed on a control unit that performs relaying processing of voice communication.

Therefore, the present invention aims to provide a relaying device that can record the communicated voice in the relaying device using a mixing function of the relaying device.

SUMMARY OF INVENTION

A relaying device according to the present invention includes a communication unit configured to communicate with a plurality of communication terminals that perform voice communication, a communication session processing unit configured to, when one communication terminal has called another at least one communication terminal, establish a communication session in which the communication terminal that has called and the at least one communication terminal that has been called are registered as participating terminals, and upon a voice signal being transmitted from a participating terminal in the established communication session, transmit this voice signal to another participating terminal in the same communication session, and a communication monitoring unit configured to register a virtual device that is a virtual communication terminal as a participating terminal of the communication session, acquire a voice signal transmitted from the communication session processing unit to the virtual device, and record or reproduce the voice signal.

A monitoring method of the voice communication according to the present invention, in the relaying device that communicates with the plurality of communication terminals that perform voice communication, establishes the communication session in which the communication terminal that has called and the at least one communication terminal that has been called are registered as participating terminals when one communication terminal has called another at least one communication terminal, transmits this voice signal to another participating terminal in the same communication session when the voice signal is transmitted from a participating terminal in the established communication session, registers the virtual device as a participating terminal of the communication session that is a virtual communication terminal for transmitting the voice signal to a communication monitoring unit provided in the relaying device, and records or reproduces the voice signal transmitted from the communication session to the virtual device, by using the communication monitoring unit.

In the above-described invention, a predetermined communication device or a predetermined group consisted of a plurality of communication terminals is associated with a virtual device, and when the predetermined communication terminal or the predetermined group which is associated with the virtual device is registered as a participating terminal of a communication session, the virtual device may register as a participating terminal of the communication session.

In the above-described invention, a plurality of virtual devices may be provided, and a plurality of communication sessions maybe separately recorded or reproduced in parallel, at same time.

In the above-described invention, the communication session that includes each of a terminal that performs telephone communication, a terminal that performs wireless communication, and a terminal that performs voice communication over a network may be established.

ADVANTAGEOUS EFFECTS OF INVENTION

According to the present invention, as a result of causing a virtual device to participate in a communication session, communicated voices of each communication session can be acquired inside the relaying device, and the voices can be recorded or output.

BRIEF DESCRIPTION OF DRAWINGS

FIG. 3A is a diagram illustrating a terminal table to be provided in the relaying device.
FIG. 3B is a diagram illustrating a mixing table to be provided in the relaying device.
FIG. 3C is a diagram illustrating a priority table to be provided in the relaying device.
FIG. 3D is a diagram illustrating a virtual device table to be provided in the relaying device.

DETAILED DESCRIPTION OF THE EMBODIMENT

Figure 2:
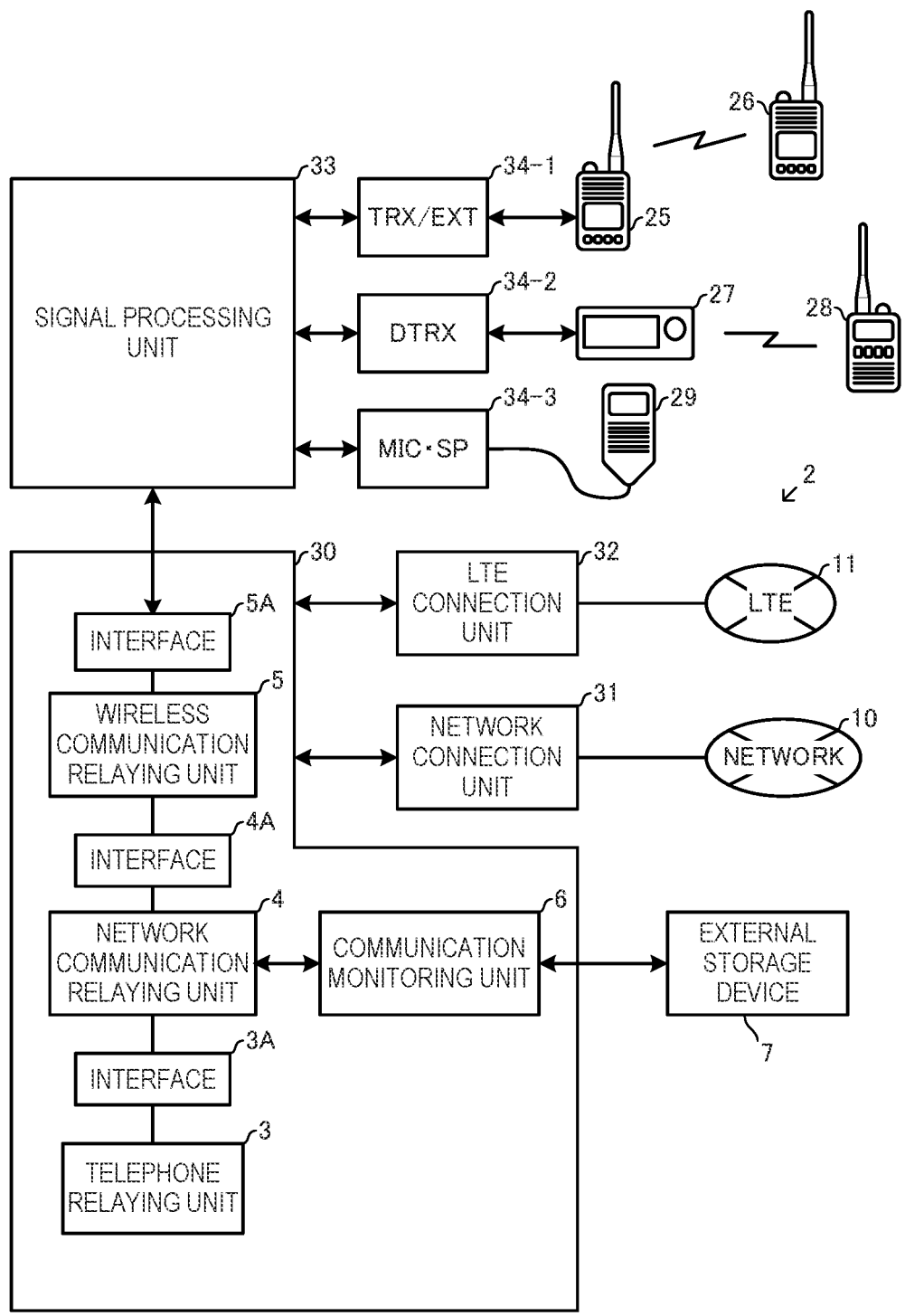
FIG. 2 is a block diagram of a relaying device.

A voice communication system of the present invention will be described with reference to the drawings. FIG. is a diagram illustrating a configuration of a voice communication system 1, which is an embodiment of the present invention. FIG. 2 is a diagram illustrating a configuration of a relaying device 2.

The voice communication system 1 realizes voice communication between a plurality of communication terminals by the relaying device 2 relaying voice signals. A SIP phone 20, an extension telephone 22, a WLAN transceiver 23, an LTE transceiver 24, an analog transceiver 26, a digital transceiver 28, and the like, which will be described later, are prepared as the communication terminals. These communication terminals are devices that transmit and receive voice signals in forms that are different to each other, and the relaying device 2 relays voice communication between these different types of communication terminals.

The relaying device 2 can monitor voices in communication. When two or more communication terminals communicate to each other, the relaying device 2 establishes a communication session for this communication. The relaying device 2 can establish a plurality of communication sessions at the same time, but selects and monitors, from the established sessions, a communication session in which a specific communication terminal (or a group) participates. The monitoring means is one of or both of recording and audio output.

Figure 1:
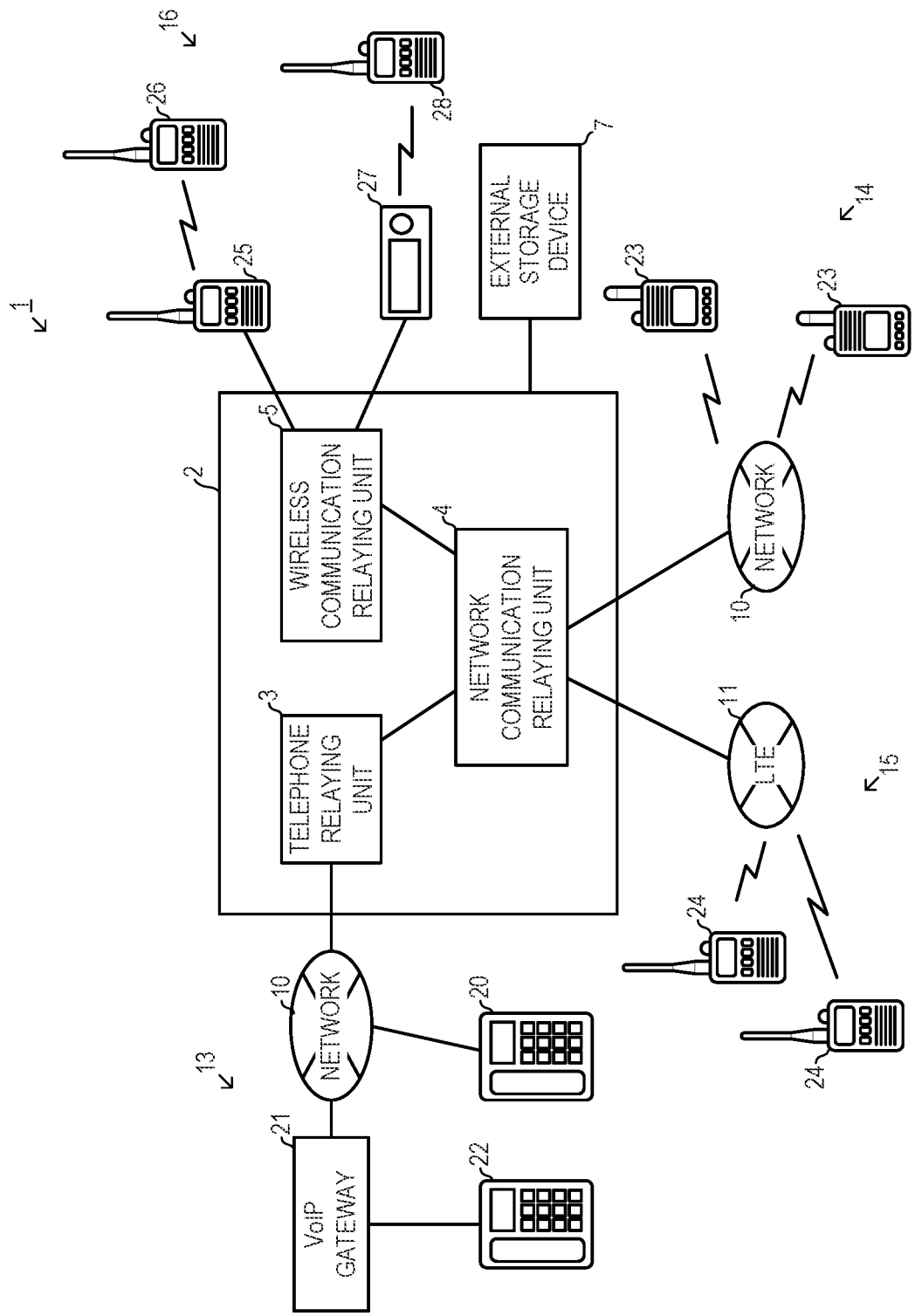
FIG. 1 is a block diagram of a voice communication system.

In FIG. 1, the relaying device 2 relays voice communication between a plurality of communication systems including an IP telephone system 13, a WLAN transceiver system 14, an LTE transceiver system 15, and a wireless communication system 16. The relaying device 2 includes a telephone relaying unit 3, a network communication relaying unit 4, and a wireless communication relaying unit 5 in order to perform these relays.

The IP telephone system 13 is connected to the telephone relaying unit 3. The IP telephone system 13 includes the SIP phone 20 and a VoIP gateway 21 that are connected to a network 10, and the extension telephone 22 connected to the VoIP gateway 21. The VoIP gateway 21 has a PBX function and is also connected to a telephone line (external line).

A network 10 including a wireless access point (not illustrated) and an LTE communication network 11 including a base station (not illustrated) are connected to the network communication relaying unit 4. The WLAN transceiver system 14 is constructed on the network 10, and the LTE transceiver system 15 is constructed on the LTE communication network 11. The WLAN transceiver system 14 includes WLAN transceivers 23 that access the network 10 via the wireless access point. The LTE transceiver system 15 includes LTE transceivers 24 that access the LTE communication network 11 via the base station. The configuration and functions of the network communication relaying unit 4 are described in detail in WO 2015/068663, which is a prior patent application of this applicant.

As shown in FIG. 2, a plurality of the external apparatus interfaces 34, which are portions of a signal processing unit 33 are connected to the wireless communication relaying unit 5. An analog-type radio transceiver (repeater) 25 and a digital-type radio transceiver (repeater) 27 are connected to the external apparatus interfaces 34. The repeater 25 communicates with a handy radio transceiver (analog transceiver) 26 of the same analog type. The repeater 27 communicates with a handy radio transceiver (digital transceiver) 28 of the same digital type. The configuration and functions of the wireless communication relaying unit 5 are described in detail in JP 2014-087027A and WO 2016/002866, which are prior patent applications of this applicant.

FIG. 2 is a block diagram of the relaying device 2. The relaying device 2 includes the telephone relaying unit 3, the network communication relaying unit 4, the wireless communication relaying unit 5, and a communication monitoring unit 6. The functions of these units are mainly realized by software. The relaying device 2 includes a control unit 30. The control unit 30 is constituted by a computer including a CPU, a ROM, a RAM, and the like. An external storage device 7, a network connection unit 31, an LTE connection unit 32, and the signal processing unit 33 are connected to the control unit 30. The external storage device 7 is a nonvolatile and large capacity storage device such as a USB hard disk, for example, and stores a voice file in which a communicated voice of a communication terminal is recorded. The network connection unit 31 is connected to the networks 10. The LTE connection unit 32 is connected to the LTE communication network 11. Although the networks 10 connected to the telephone relaying unit 3 and the network communication relaying unit 4 are separately described in FIG. 1, these networks maybe the same.

In the relaying device 2, the functions of the telephone relaying unit 3, the network communication relaying unit 4, the wireless communication relaying unit 5, and the communication monitoring unit 6 are realized by cooperation between hardware including the control unit 30 and software. The telephone relaying unit 3 includes an interface 3A for transmitting and receiving a voice signal and the like to and from the network communication relaying unit 4. The network communication relaying unit 4 includes an interface 4A for transmitting and receiving a voice signal and the like to and from the wireless communication relaying unit 5. Also, the wireless communication relaying unit 5 includes an interface 5A for transmitting and receiving a voice signal and the like to and from the signal processing unit 33. The signal processing unit 33 extracts a voice signal from an RTP packet received from the control unit 30 (interface 5A), converts the voice signal to a digital or analog signal wave, and outputs the signal wave to the external apparatus interface 34. Also, the signal processing unit 33 compresses and encodes a digital or analog voice signal received from the external apparatus interface 34, and also packetizes the encoded data into an RTP packet, and inputs the RTP packet to the control unit 30 (interface 5A).

Three external apparatus interfaces 34 (34-1 to 34-3) are provided, namely an analog interface 34-1, a digital interface 34-2, and an analog (microphone at hand/speaker) interface 34-3. A state in which repeaters 25 and 27 are respectively connected to the analog interface 34-1 and the digital interface 34-2 is shown in FIG. 1.

The network communication relaying unit 4 relays communication between the WLAN transceivers 23, communication between the LTE transceivers 24, and communication between a WLAN transceiver 23 and an LTE transceiver 24. Also, in response to a call from the telephone relaying unit 3, the network communication relaying unit 4 relays communication between the telephone 20 or 22 (SIP phone 20, extension telephone 22) and a WLAN transceiver 23 or an LTE transceiver 24, and the communication between the telephone 20 or 22 and the radio transceiver 26 or 28. Also, the control of a communication session and the mixing of voice signals, which will be described later, are executed by the network communication relaying unit 4. The network communication relaying unit 4 corresponds to a communication session processing unit of the present invention.

The telephone relaying unit 3, upon receiving a call from the SIP phone 20 or the extension telephone 22, determines the communication partner communication apparatus (destination radio), which is the call destination, and inputs the information regarding the destination radio and the voice signal received from the telephone 20 or 22 to the network communication relaying unit 4. It should be noted that the entirety or some of the telephone relaying unit 3, the network communication relaying unit 4, and the wireless communication relaying unit 5 including the signal processing unit 33 corresponds to a communication unit of the present invention.

The communication monitoring unit 6 monitors voices in a communication session in which, out of the plurality of communication terminals, the communication terminal to be monitored participates. As described above, the monitoring refers to recording and/or outputting a communicated voice. In the following description, a case where recording is performed will be described. Recorded voices (voice files) are stored in the external storage device 7.

Each communication terminal is registered in a terminal table (call destination table) 40 shown in FIG. 3A. A user who intends to start communication calls a communication terminal of the communication partner using a possessing communication terminal. As a result of this call operation, a call message is generated and transmitted to the relaying device 2. Upon the relaying device 2 receiving the call message, the relaying device 2 registers the communication session to a mixing table 41 shown in FIG. 3B (establishes the communication session), and calls the communication terminal of the communication partner. With this, communication between the communication terminals is started.

Figure 4:
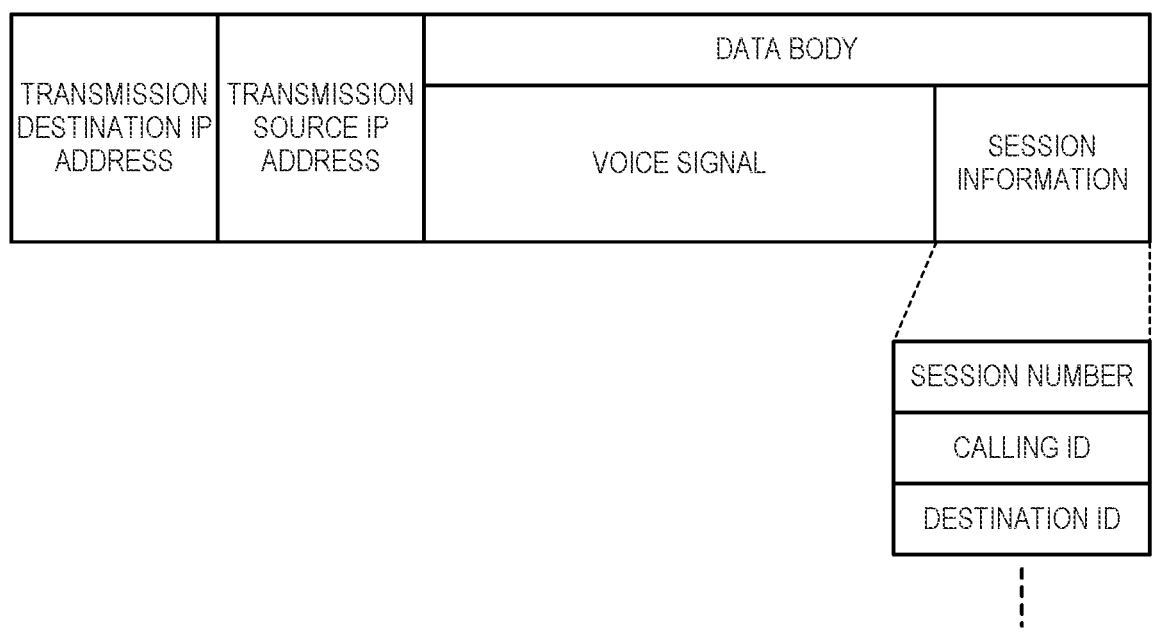
FIG. 4 is a diagram illustrating a configuration of a voice packet.

The communication terminals excluding the telephones 20 and 22 start communication by transmitting an RIP packet in which a voice signal is stored as a data body. That is, communication is started in a form such as a radio transceiver with which communication is started by a PTT switch being pressed. The RTP packet that is first transmitted when starting communication is referred to as a call packet. This call packet functions as the call message. This RTP packet used in the voice communication system 1 is configured as shown in FIG. 4. On the other hand, when the telephone 20 or 22 starts communication, first, the telephone transmits a SIP message (INVITE) to the relaying device 2. The relaying device 2 establishes a communication session with another communication apparatus following a SIP procedure. In the following description, a case will be described where, as a result of a communication terminal such as the WLAN transceiver 23 transmitting a call packet, a communication session is established.

Various types of tables to be provided in the control unit 30 of the relaying device 2 will be described with reference to FIGS. 3A to 3D. FIG. 3A is a diagram illustrating the terminal table (call destination table) 40. Pieces of information regarding each communication terminal and each group that are registered in the voice communication system 1 are registered in the terminal table 40. A plurality of communication terminals belong to each group, and when the group is called, the plurality of communication terminals that belong to the group are simultaneously called. In association with each communication terminal, an identification number (ID), address information for accessing the communication terminal, and a participating session number indicating the communication session in which the communication terminal is participating are stored in the terminal table 40. With respect to each registered group, the identification numbers of communication terminals that belong to this group are stored. The identification number (ID) corresponds to identification information of the present invention. In this table, the group "plenary" to which all the communication terminals belong is treated similarly to other groups.

It should be noted that the call type is information indicating that, when this ID is called, what type of communication will be executed. "Individual" communication indicates one to one communication between individual communication terminals. "Group" communication is communication in which a plurality of communication terminals (three or more, in general) exchange voice signals to each other. "Plenary" communication is communication in which all the communicable communication terminals that are connected to the network 10, the LTE communication network 11, and the external apparatus interface 34 exchange voice signals to each other.

When a communication terminal calls another communication terminal, the communication terminal transmits an RIP packet (voice packet) in which the identification number (destination ID) of the communication terminal to be called is written, to the relaying device 2. FIG. 4 is a diagram illustrating a configuration of the RTP packet to be used in this voice communication system. The RTP packet includes a header and a data body (payload), and a transmission destination address and a transmission source address are described in the header. The data body includes a voice signal and session information for voice communication. The session information is information regarding a communication session to be registered in the mixing table 41 in FIG. 3B, and with this, the communication session to which this RTP packet relates to can be identified. The session information includes a session number, a destination ID, and a calling ID. It should be noted that in the case of a call packet that is a voice packet to be transmitted first when communication is started, because the communication session for this voice packet is not yet established (communication session is not registered in the mixing table 41), the session number field is empty.

FIG. 3B is a diagram illustrating the mixing table 41. A communication session that has been established and is being executed is registered in the mixing table 41. The relaying device 2 transfers a voice signal received from one communication terminal that is participating in a communication session to at least one other communication terminal that is participating in the communication session. If a plurality of voice signals are input at the same time, these voice signals are mixed and transmitted to communication terminals. Even in a case where voice signals are mixed and transmitted to each communication terminal, the relaying device 2 performs echo-canceling mixing for the communication terminal such that a voice signal transmitted from this communication terminal is not returned to the same communication terminal.

The mixing table 41 is provided with a session number field, a calling ID field, a destination ID field, a participating terminal field, an excluded terminal field, and a retention time timer (TS) field for each communication session. The session number is a number for identifying the communication session, and is assigned a serial number that indicates the order of establishment (order of registration) of the communication session. The identification number of a communication terminal that has made a call (transmitted a call packet) is stored in the calling ID field. The identification number of a communication terminal or a group that has been called by the call packet is stored in the destination ID field.

The identification number of a communication terminal that is participating in the communication session is registered in the participating terminal field. Also, the identification number of a communication terminal that has been called in (belongs to) the communication session but is not participating in the communication session, because the communication terminal is participating in another communication session and performs communication, is registered in the excluded terminal field. When a voice signal is transmitted from one communication terminal (participating terminal) whose identification number is registered in the participating terminal field, the control unit 30 transfers this voice signal to the other participating terminal(s).

In the case of the group communication session, the identification number of a calling terminal and the identification numbers of communication terminals that belong to the group designated as the communication partner are registered in the participating terminal field. Note that a communication terminal that belongs to the group, but is participating in a different communication session is excluded from the participating terminal, because the communication terminal cannot participate in the group communication session, and the identification number thereof is registered in the excluded terminal field. Also, if the calling terminal is a communication terminal that does not belong to the group, which is a case where the calling terminal calls a group other than the group to which the calling terminal belongs, the identification number of the calling terminal is also registered in the participating terminal field. In the case of a plenary communication session, all of the communication terminals that can perform communication are registered as the participating terminals.

The retention time of each communication session is set to 30 seconds, for example. The retention time timer (TS) in the mixing table 41 is a timer that is counted down when a voice signal is transmitted from none of the participating terminals. The retention time timer TS is reset by communication session management processing (refer to FIG. 9) (30 seconds being set), and is also counted down. If a voice signal is transmitted from none of the participating terminals for 30 seconds, and the time counted down by the timer TS reaches this communication session is canceled, and the information regarding this communication session is erased from the mixing table 41.

FIG. 3C is a diagram illustrating a priority table 42. The priority of each call type of communication is stored in the priority table 42. The priority is represented by a numerical value, and the smaller the value is, the priority is higher. In the case where one communication terminal is called from a plurality of communication sessions in an overlapped manner, which of the communication sessions the communication terminal is to be participated in is determined based on the priorities in the priority table 42. The case where one communication terminal is called from a plurality of communication sessions in an overlapped manner includes a case where the communication terminal is called from a plurality of communication sessions at the same time, and a case where, while the communication terminal is participating in one communication session, the communication terminal is called from another communication session, for example.

It should be noted that if the priority of the current communication session and the priority of a new communication session are the same, the communication terminal continues to participate in the current session, and will not move to the new communication session. The configuration may also be such that the communication terminal is moved to the new communication session even if the priorities are the same. Also, the contents of the priority table 42 are not limited thereto, and the individual communication session may be priority number 1, for example.

FIG. 3D is a diagram illustrating a virtual device table 43. In the virtual device table 43, the identification code (such as VD1) of a virtual device and the identification number (ID) of a recording target (a communication terminal or a group that is to be monitored) are stored in an associated manner. When a communication session in which a communication terminal of an identification number in this table participates is established, the corresponding virtual device is caused to participate in this communication session. The mixing function of the communication session also transmits the voice signals that are transmitted and received in the communication session to the virtual device. The communication monitoring unit 6 acquires and records the voice signals. The virtual device is a virtually working device that is caused to participate in the communication session in order to acquire voice signals for recording, from a function unit (network communication relaying unit 4) that performs mixing of voice signals, and the communication monitoring unit 6 causes the virtual device to participate in the communication session in which the communication target participates. With this, the network communication relaying unit 4 outputs voice signals to the communication monitoring unit 6 as the voice signals to be transmitted to the virtual device when mixing is performed, and the communication monitoring unit 6 can acquire all of the voice signals of the communication session (in which the recording target is participating). When the recording target has left the communication session, the virtual device also leaves the session. The configuration may also be such that the communication monitoring unit 6 outputs voice signals to a speaker or the like for allowing the user to hear, and recording (or without recording) the voice signals of the communication session that is the recording target.

While the details will be described later with reference to a flowchart, the communication monitoring unit 6 continuously buffers voices in the communication session that the recording target is participating, divides the voice data into data of a predetermined size (e.g. 100 MB), and makes a file of the data. Also, when the state of a communication session in which the recording target is participating is changed, e.g. when the communication session in which the recording target is participating is started/moved/ended, a file of the buffered voice signals is made at the timing of each change of the state.

The relaying device 2 transmits voice packets (voice signals), that is transmitted from a communication terminal and that is input over the network 10 or via the LTE communication network 11 or the external apparatus interface 34, to another communication terminal further over the network 10 or via the LTE communication network 11 or the external apparatus interface 34. In the case of the group communication, a voice signal is transmitted to a plurality of communication terminals that belong to the group. Also, in the case of the group communication, there are cases where the users of a plurality of communication terminals speak at the same time, and voice packets are transmitted from the plurality of communication terminals at the same time. In such a case, the relaying device 2 edits new voice packets by mixing these voice signals of the plurality of voice packets, and transmits these new voice packets to the respective communication terminals. It should be noted that a voice packet in which all of the voice signals are mixed is transmitted to a communication terminal that has not transmitted a voice signal, and with respect to a communication terminal that has transmitted a voice signal, a voice packet in which all of the voice signals excluding the voice signal that the communication terminal has transmitted are mixed is transmitted to the communication terminal. With this, an echo of a voice signal that a communication terminal has transmitted will not occur in the communication terminal. Besides, in the case of performing communication in a form of the plenary communication as well, mixing is performed in a manner similar to the group communication. Since a virtual device does not transmits a voice signal, all of the voice signals in the communication session is transmitted to the virtual device.

Figure 5:
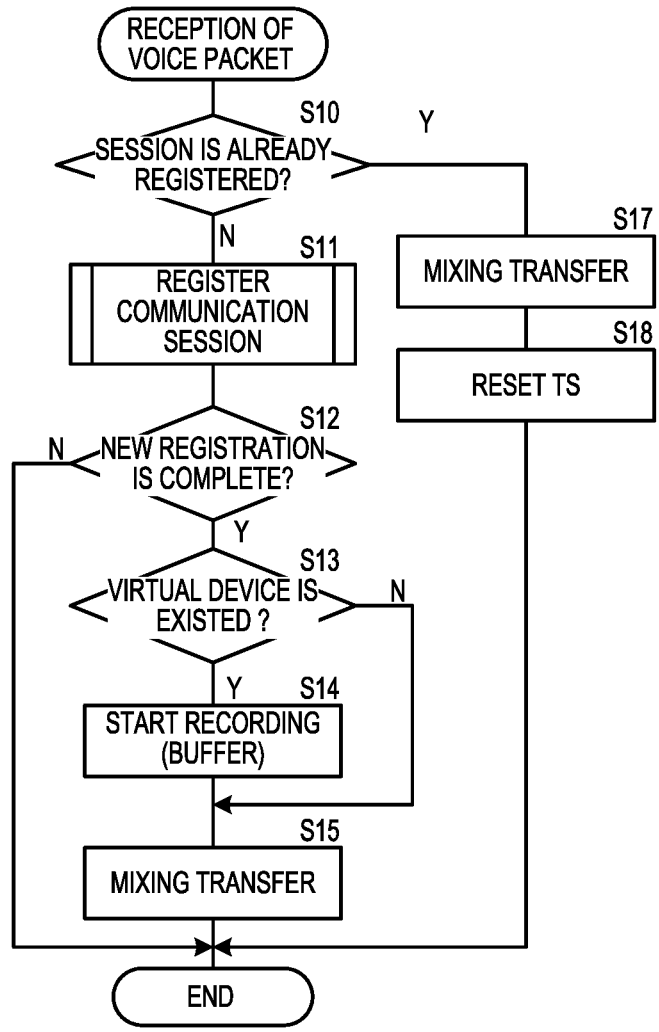
FIG. 5 is a flowchart illustrating processing when a voice packet is received.

The operations of the relaying device 2 will be described with reference to the flowcharts in FIGS. 5 to 11. FIG. 5 illustrates the processing operations of the control unit 30 at the time of receiving a voice packet. Upon receiving a voice packet, the control unit 30 reads session information of this voice packet, and determines whether or not the communication session has already been registered in the mixing table 41 (step S10). If the communication session has already been registered in the mixing table 41 (YES in step S10), the control unit 30 transmits the voice signal of the received voice packet to at least one other communication terminal that is participating in the communication session by referring to the participating terminal field of the mixing table 41 (step S17). The control unit 30 further resets the retention time timer TS in the mixing table 41 to 30 seconds (step S18).

If the communication session of the received voice packet is not registered in the mixing table 41 (NO in step S10), that is, if this voice packet is a call packet, which is a first voice packet, the control unit 30 performs registration processing for registering a new communication session due to this voice packet to the mixing table 41 (step S11). Hereinafter, this registration processing will be described using FIG. 6.

Figure 6:
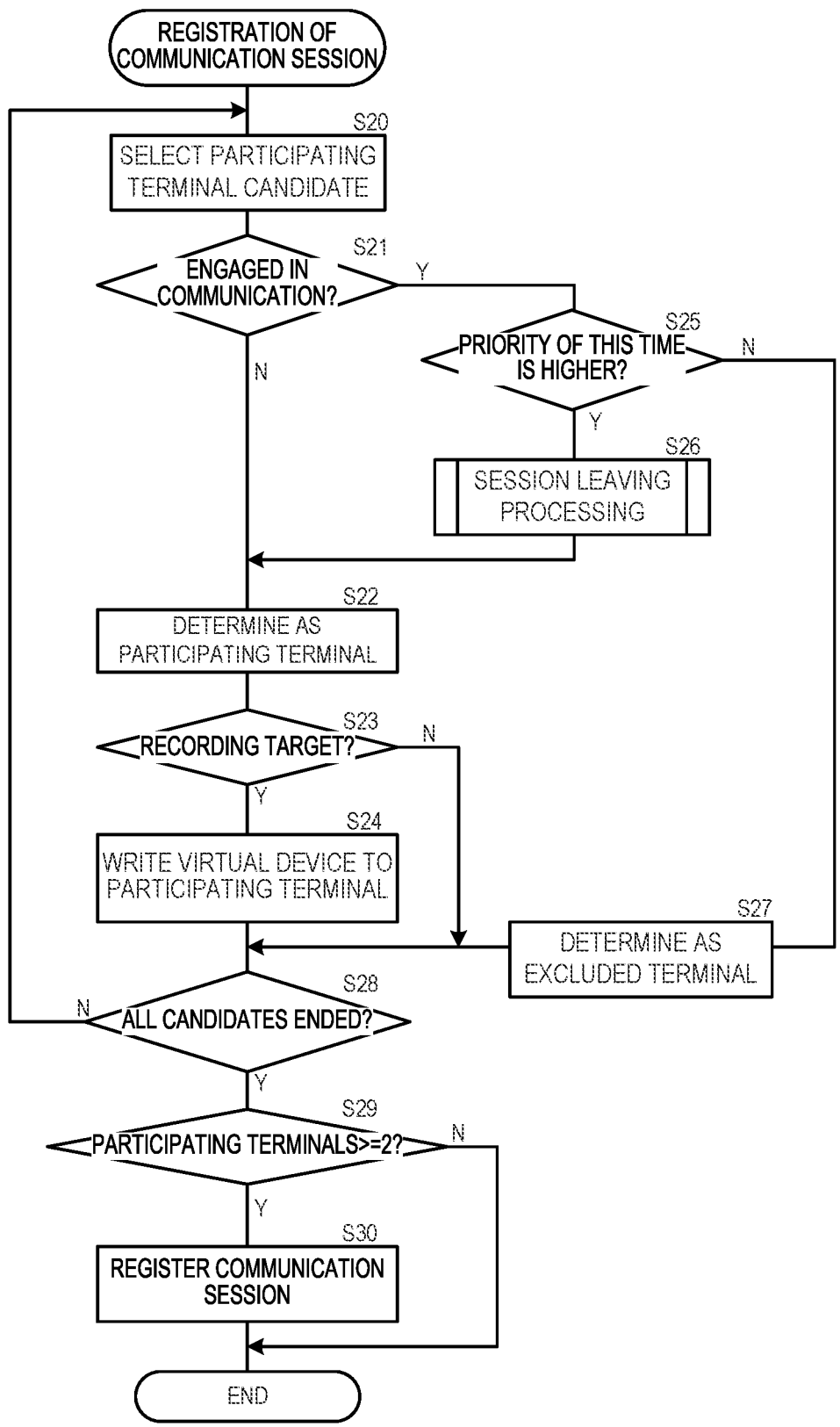
FIG. 6 is a flowchart illustrating communication session registration processing.

FIG. 6 is a flowchart illustrating operations of the registration processing of the communication session that is executed in step S11 in FIG. 5. The control unit 30 extracts participating terminal candidates constituted by the calling terminal and communication terminals to be called in the new communication session based on the destination ID and the calling ID included in the received call packet, and selects one of the participating terminal candidates (step S20). Next, the control unit 30 determines whether or not the communication terminal of this participating terminal candidate is engaged (participating in another communication session) (step S21). If it is determined, in step S21, that the communication terminal is not engaged (NO in step S21), the control unit 30 determines that this communication terminal is a participating terminal of the communication session to be established this time (step S22). The control unit 30 determines whether this communication terminal is a recording target communication terminal (step S23). If the communication terminal is a recording target (YES in step S23), a virtual device VDn associated with this communication terminal is also included in the participating terminals (step S24).

If it is determined, in step S21, that the communication terminal of this participating terminal candidate is engaged (YES in step S21), the control unit 30 compares the priority of the communication session in which this communication terminal is currently participating with the priority of this new communication session (step S25). If the priority of the new communication session is higher (YES in step S25), the control unit 30 executes leaving processing for causing this communication terminal to leave the currently participating communication session (step S26), and determines that this communication terminal as the participating terminal of the new communication session (step S22). If this communication terminal is a recording target (YES instep S23), the control unit 30 also includes a corresponding virtual device VDn in the participating terminals (step S24). In step S25, if the priority of the new communication session is the same as or lower than the priority of the communication session in which this communication terminal is currently participating (NO in step S25), the control unit 30 does not cause this communication terminal to participate in the new communication session, and determines to be an excluded terminal of the new communication session (step S27). The control unit 30 repeats the processing from step S20 to step S27 with respect to all of the participating terminal candidates (step S28).

If the processing described above has been executed with respect to all of the participating terminal candidates (YES in step S28), the control unit 30 determines the number of communication terminals that have been determined as the participating terminals (step S29). If the number of participating terminals excluding the virtual devices is two or more (YES in step S29), the control unit 30 registers this new communication session to the mixing table 41 (step S30), and ends this processing. Also, in step S29, if the number of participating terminals is less than two (NO in step S29), the control unit 30 determines that this new communication session cannot be established, and does not register the new communication session to the mixing table 41, and ends this registration processing.

Returning to FIG. 5, the control unit 30 determines, in step S12, whether or not a new communication session has been registered in the communication session registration processing (step S11 in FIG. 6). If a new communication session has not been registered (NO in step S12), the control unit 30 ends the processing incurred by the reception of this voice packet. On the other hand, if a new communication session has been registered in step S12 (YES in step S12), the control unit 30, if the virtual device is included in the participating terminals (YES in step S13), starts buffering of the new communication session is started (step S14), and transfers the voice signal of the received voice packet to a communication terminal that is participating in the communication session by referring to the participating terminal field of the mixing table 41 (step S15).

Figure 7:
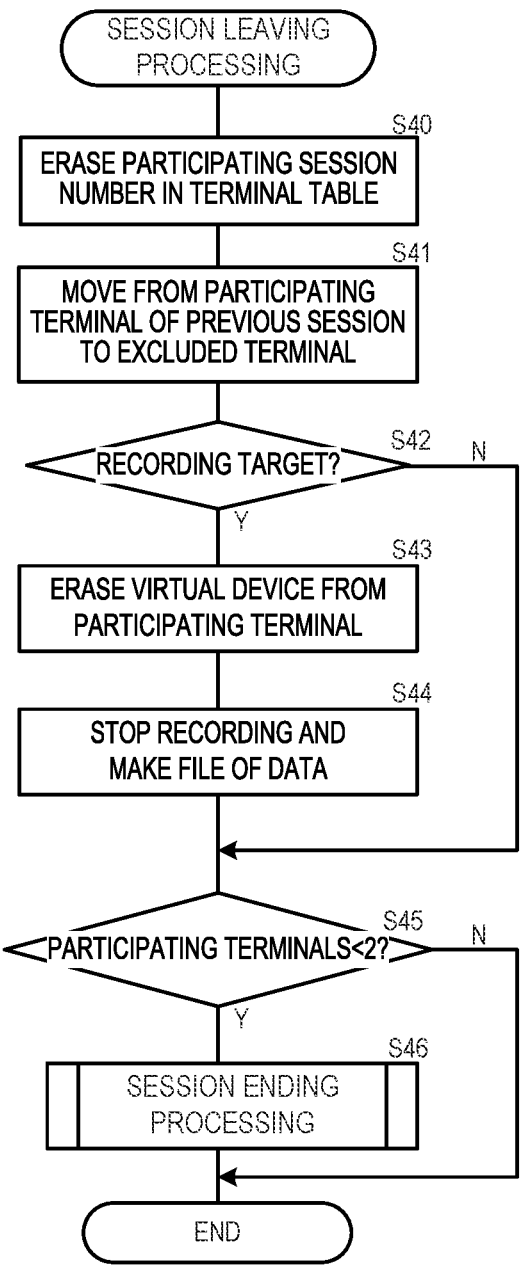
FIG. 7 is a flowchart illustrating session leaving processing.

Next, the session leaving processing to be executed in step S26 in FIG. 6 will be described with reference to FIG. 7. This processing is processing for causing a communication terminal that is participating in a communication session to leave the communication session in order to move the communication terminal to another communication session whose priority is higher, as shown in FIG. 6. The control unit 30 erases the participating session number in the terminal table (step S40), and moves the identification number of this communication terminal from the participating terminal field, in the mixing table 41, of the communication session that the communication terminal is currently participating to the excluded terminal field (step S41). Then, it is determined whether this communication terminal is a recording target or not (step S42). If this communication terminal is a recording target (YES instep S42), the control unit 30 erases the virtual device VDn from the participating terminal field (step S43), stops recording (buffering) of this communication session, and makes a file of the data of voice that has been buffered until this point in time (step S44). If, as a result of the communication terminal having left the communication session, the number of the participating terminals thereof has decreased to less than two (YES in step S45), session ending processing for ending this communication session (step S46) is executed (step S46). If the recording target communication terminal has left the communication session, recording is immediately started in a communication session in which this communication terminal has newly participated (See step S24 in FIG. 6 and step S14 in FIG. 5).

Figure 8:
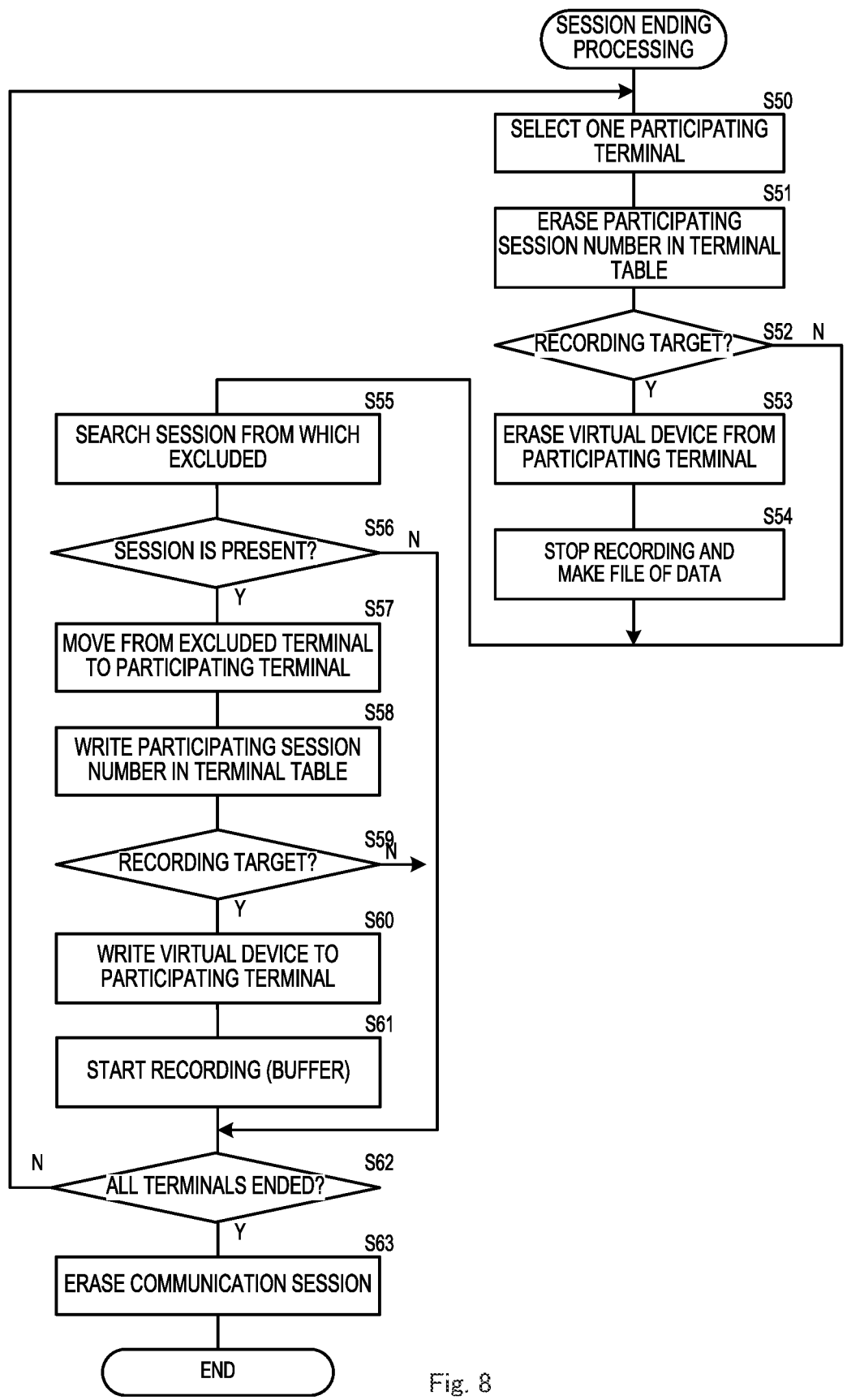
FIG. 8 is a flowchart illustrating communication session ending processing.

FIG. 8 is a flowchart illustrating the session ending processing. This processing is executed when, as a result of a participating terminal having left, the number of participating terminals has decreased to less than two, as described above, and when the voices in the communication session have stopped, and a predetermined time (30 seconds) has elapsed in a soundless state. The control unit 30 selects one participating terminal in the communication session that is caused to be ended (step S50), erases the participating session number of this communication terminal in the terminal table 40 (step S51), and determines whether this communication terminal is a recording target (step S52). If it is determined to be a recording target (YES in step S52), the control unit 30 erases the virtual device VDn from the participating terminal field (step S53), stops recording (buffering) of this communication session, and makes a file of the data of voice that has been buffered until this point in time (step S54).

The control unit 30 searches whether the identification number of this communication terminal is registered in the excluded terminal fields of the other communication sessions registered in the mixing table 41 (step S55). If a communication session in which this communication terminal is registered as an excluded terminal is present (YES in step S56), in order to make the excluded communication terminal participate in this communication session in which the communication terminal has been excluded, the control unit 30 moves the identification number of this communication terminal from the excluded terminal field to the participating terminal field of this communication session (step S57), and writes the session number of this communication session to the participating session number field of this communication terminal in the terminal table 40 (step S58). The control unit 30 then determines whether this communication terminal is a recording target (step S59). If it is determined to be a recording target (YES in step S59), the control unit 30 writes the virtual device VDn in the participating terminal field of the communication session (step S60), and starts recording (buffering) of this communication session (step S61). After having executed the processing from step S50 to step S61 with respect to all of the participating terminals (YES in step S62), the control unit 30 erases this communication session from the mixing table 41 (step S63), and ends the session ending processing.

Figure 9:
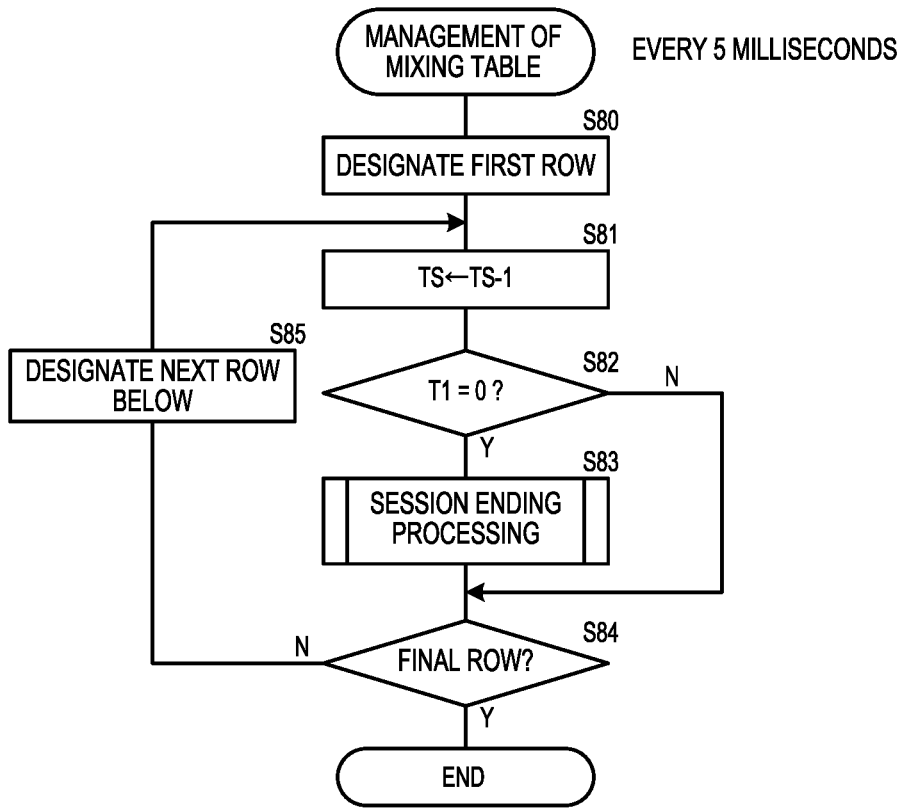
FIG. 9 is a flowchart illustrating communication session management processing.

FIG. 9 is a flowchart illustrating the communication session management processing. In the communication session management processing, the control unit 30 counts the soundless time of each communication session registered in the mixing table 41, and when a predetermined time (30 seconds) has elapsed, ends the communication session. This processing is regularly (e.g. every 20 milliseconds) executed repeatedly. The control unit 30, first, designates the communication session in the first row of the mixing table 41 (step S80). The control unit 30 reduces the retention time timer TS of the designated communication session by one count (20 milliseconds worth) (step S81), and determines whether or not the retention time timer TS reaches 0 due to this reduction (step S82). If the retention time timer TS reaches 0 (YES in step S82), the control unit 30 determines that this communication session has ended, and erases the session ending processing with respect to the communication session of this row (step S83, FIG. 8). The control unit 30 manages the mixing table 41 by successively performing the processing described above until the last row of the mixing table 41 (steps S84 and S85).

Figure 10:
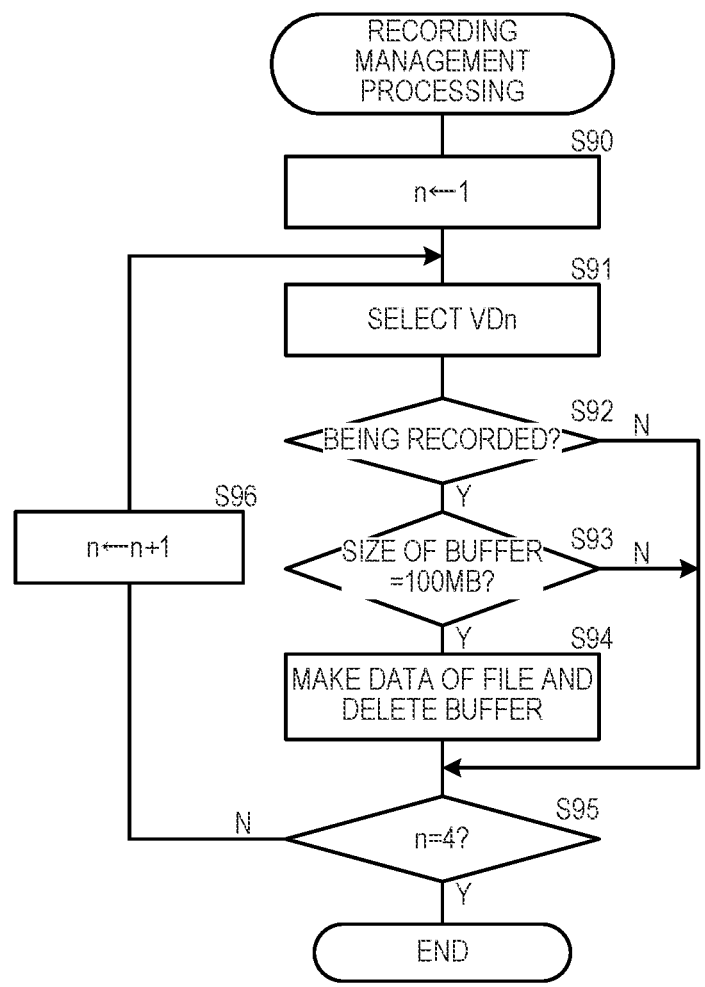
FIG. 10 is a flowchart illustrating recording processing.

FIG. 10 is a flowchart illustrating recording management processing operations to be executed by the communication monitoring unit 6 of the control unit 30. This processing is a processing for managing the communication session and executed at fixed intervals (20 milliseconds) with respect to a virtual device VDn. First, the communication monitoring unit 6 sets "1" to "n" (step S90), and selects the virtual device VDn (step S91). The communication monitoring unit 6 determines whether or not this virtual device VDn is recording data of voice, that is, determines whether or not the communication terminal which is a recording target is participating in the communication session (step S92). If the data of voice of the communication session are being recorded (YES in step S92), the communication monitoring unit 6 determines whether or not size of the buffered recorded voice reaches a predetermined size (100 MB) (step S93). If the size of the buffered data of recorded voice reaches 100 MB (YES in step S93), the communication monitoring unit 6 makes a file of the buffered recorded voice and deletes the buffered recorded voice until this point in time (step S94). Note that newly recorded voice is continuously buffered. If the virtual device VDn is not recording voice (NO in step S92), and the size of the buffered recorded voice does not reach 100 MB, the communication monitoring unit 6 performs nothing. While sequentially adding "1" to "n" (step S96), processing of step S90 to step S94 are performed, and the processing are ended after abovementioned processing are performed to all the virtual device VDn (YES in step S95).

A file of recorded voices (voice files) are stored in the external storage device 7. In the external storage device 7, a saving directory "voice_data[n]" (n is the virtual device number) for saving recorded voices is created for each virtual device VDn (n=1 to 4). A folder for each date is created under each directory. "Date in which saving is started" is used as the folder name. For example, the folder for the virtual device VD1 for Sep. 10, 2018 is "/voice_data1/20180910". Also, the file name of a voice file that is created every 100 MB is named such that a communication type is added to MM (month) DD (day) HH (hour) DD (minutes) SS (seconds) at which buffering has started. The communication type includes "_all" in the case of plenary communication, "_group100" (100 is a group ID) in the case of group communication, "_uid10" (transceiver ID) or "_tel1234" (telephone number of IP telephone) in the case of individual communication, and the like. For example, the file name of a voice signal in a communication session having a group ID 100 whose buffering has started at 18:01 on September 10th is "0910180100_group100.wav". Therefore, the voice signal of the communication session having the group ID 100 with respect to which the virtual device VD1 has started buffering at 18:01 on September 10th is saved as "/voice data1/20180910/0910180100_group100.wav", for example.

In the above-described embodiment, the recorded voice data is in WAVE format, but an any encoded format can be used. An MP3 format can be used, for example. Also, when capacity of the external storage device 7 is not sufficient, older files of recorded voice may be sequentially deleted (overwritten).

In the above-described embodiment, although a virtual device table 43 is provided and the virtual device is associated with the communication terminal or the communication group, the virtual device may be associated with the communication terminal or the communication group by a user of the relaying device 2 without making the virtual device associate with the communication terminal or the communication group in advance.

Also, in the present embodiment, a file is made every time the size of the buffered recorded voice reaches a predetermined size, but a file may be made every time the recording time reaches a predetermined time length.

REFERENCE NUMERALS

1 Voice communication system
2 Relaying device
3 Telephone relaying unit
3A Interface
4 Network communication relaying unit
5 Wireless communication relaying unit
6 Communication monitoring unit
7 External storage device
20 SIP phone
22 Extension telephone
25 Analog radio (repeater)
26 Analog transceiver
27 Digital radio (repeater)
28 Digital transceiver
29 Microphone/speaker
34-1 to 34-3 External apparatus interface

What is claimed is:

1. A relaying device comprising:
    a communication unit configured to communicate with a plurality of communication terminals that perform voice communication;
    a communication session processing unit configured to have a mixing table
        when one communication terminal has called another at least one communication terminal, to establish a communication session in which the communication terminal that has called and the at least one communication terminal that has been called are registered as participating terminals, and
        upon a voice signal being transmitted from a participating terminal in the established communication session, to transmit this voice signal to another participating terminal in the same communication session wherein the another participating terminal is determined by referring to the mixing table; and
    a communication monitoring unit configured to register a virtual device that is a virtual communication terminal as a participating terminal of the communication session in the mixing table, acquire a voice signal transmitted from the communication session processing unit to the virtual device, and record or reproduce the voice signal, wherein
    the communication monitoring unit associates the virtual device with a predetermined communication terminal or a predetermined group constituted by a plurality of communication terminals, and
    if the communication terminal or group with which the virtual device is associated is registered as a participating terminal of the communication session in the mixing table, the communication monitoring unit registers the virtual device as a participating terminal of the communication session.

2. The relaying device according to claim 1, wherein the communication monitoring unit provides a plurality of the virtual devices, and separately performs, in parallel, recording or reproducing regarding a plurality of communication sessions at the same time.

3. The relaying device according to claim 1,
    wherein the communication unit communicates with a communication terminal that performs telephone communication, a communication terminal that performs wireless communication, and a communication terminal that performs voice communication over a network, and
    the communication session processing unit establishes a communication session in which these communication terminals are registered as participating terminals.

4. A monitoring method of voice communication, in a relaying device that communicates with a plurality of communication terminals that perform voice communication, the monitoring method comprising:
    establishing, when one communication terminal has called another at least one communication terminal, a communication session in which the communication terminal that has called and the at least one communication terminal that has been called are registered as participating terminals in a mixing table;
    transmitting, when a voice signal is transmitted from a participating terminal in the established communication session, this voice signal to another participating terminal in the same communication session wherein the another participating terminal is determined by referring to the mixing table;
    registering a virtual device, as a participating terminal of the communication session in the mixing table, that is a virtual communication terminal for transmitting the voice signal to a communication monitoring unit provided in the relaying device;
    recording or reproducing a voice signal transmitted from the communication session to the virtual device, by using the communication monitoring unit,
    associating the virtual device with a predetermined communication terminal or a predetermined group constituted by a plurality of communication terminals; and
    if the communication terminal or group with which the virtual device is associated is registered as a participating terminal of the communication session in the mixing table, registering the virtual device as a participating terminal of the communication session in the mixing table.

5. The monitoring method of voice communication according to claim 3, wherein a plurality of the virtual devices are provided, and recording or reproducing regarding a plurality of communication sessions are separately performed, in parallel, at the same time.

6. The monitoring method of voice communication according to claim 4, wherein the plurality of communication terminals include at least one each of a terminal that performs telephone communication, a terminal that performs wireless communication, and a terminal that performs voice communication over a network.

* * * * *